(12) United States Patent
Smith

(10) Patent No.: US 11,376,686 B2
(45) Date of Patent: Jul. 5, 2022

(54) HOT GASEOUS WELDER SYSTEM AND METHOD

(71) Applicant: Safran Aerosystems Services Americas, LLC, College Park, GA (US)

(72) Inventor: James Wood Smith, Stone Mountain, GA (US)

(73) Assignee: Safran Aerosystems Services Americas, LLC, College Park, GA (US)

( * ) Notice: Subject to any disclaimer, the term of this patent is extended or adjusted under 35 U.S.C. 154(b) by 388 days.

(21) Appl. No.: 16/260,444

(22) Filed: Jan. 29, 2019

(65) Prior Publication Data
US 2020/0238429 A1    Jul. 30, 2020

(51) Int. Cl.
| | |
|---|---|
| *B23K 9/32* | (2006.01) |
| *B23K 9/29* | (2006.01) |
| *B23K 9/16* | (2006.01) |
| *B23K 9/095* | (2006.01) |
| *B23K 103/00* | (2006.01) |

(52) U.S. Cl.
CPC .............. *B23K 9/325* (2013.01); *B23K 9/095* (2013.01); *B23K 9/16* (2013.01); *B23K 2103/42* (2018.08)

(58) Field of Classification Search
CPC .. B23K 9/325; B23K 9/095; B23K 9/16–164; B23K 9/29–291; B23K 2103/42; B29C 66/0014–00143; B29C 64/371; B29C 65/10–106
See application file for complete search history.

(56) References Cited

U.S. PATENT DOCUMENTS

| | | | | |
|---|---|---|---|---|
| 3,497,670 | A  * | 2/1970 | Thostrup | B23K 9/164 |
| | | | | 219/137.42 |
| 3,811,027 | A  * | 5/1974 | Strahan | B23K 9/325 |
| | | | | 219/74 |
| 3,839,126 | A | 10/1974 | Haller | |
| 9,091,284 | B2 * | 7/2015 | Renner | B23K 9/164 |
| 2009/0302007 | A1* | 12/2009 | Richard | B23K 9/16 |
| | | | | 219/59.1 |
| 2010/0126969 | A1* | 5/2010 | Klangos | B23K 9/325 |
| | | | | 219/75 |

(Continued)

FOREIGN PATENT DOCUMENTS

WO    2020160070 A1    8/2020

OTHER PUBLICATIONS

International Patent Application No. PCT/US2020/015548, International Search Report and Written Opinion, dated Apr. 30, 2020.

*Primary Examiner* — Michael A Laflame, Jr.
(74) *Attorney, Agent, or Firm* — Kilpatrick Townsend & Stockton LLP

(57) ABSTRACT

Described is a heated gaseous welder system and associated methods of welding plastic with the heated gaseous welder system. The heated gaseous welder system includes a welding tool and a welder control unit. The welder control unit includes a gaseous control system and a heater control system. The gaseous control system is configured to selectively supply a gas to the welding tool and control at least one characteristic of the gas supplied to the welding tool. The heater control system is configured to selectively control power supplied to the welding tool.

10 Claims, 12 Drawing Sheets

(56) References Cited

U.S. PATENT DOCUMENTS

| | | | |
|---|---|---|---|
| 2013/0186866 A1* | 7/2013 | Lahti | B23K 37/00 |
| | | | 219/75 |
| 2016/0016250 A1* | 1/2016 | Denis | B23K 9/12 |
| | | | 219/130.1 |
| 2018/0093424 A1 | 4/2018 | Lewis | |
| 2018/0229325 A1* | 8/2018 | Crescenze | B23K 9/1012 |
| 2020/0100351 A1* | 3/2020 | Raymond | H05H 1/36 |

* cited by examiner

HOT GASEOUS WELDER SYSTEM AND METHOD

FIELD OF THE INVENTION

The field of the invention relates to welder systems and methods, and, more particularly, to hot gaseous welder systems and methods.

BACKGROUND

Passenger vehicles, such as aircraft, buses, trains, ships, and automobiles, include many non-structural components that are often highly visible to the customer. These components go by several common names such as trims, shrouds, doublers, or other unique identifiers, and are commonly constructed from various types of plastics. During regular use, these plastic components may deform, crack, or otherwise become compromised due to impact, wear, vibrations, etc.

Some attempts have been made to repair defective plastic components used in aerospace applications through adhesives or composite reinforcement. However, adhesive repair lacks substantial strength for such plastic components, particularly when used in thin layers as required by some plastic components. Composite reinforcement has similar disadvantages and does not create an effective bond with the plastic, does not eliminate the crack or visibility of damage, and requires a long repair time due to resin curing. In view of the inability to repair damaged plastic components, most Original Equipment Manufacturers (OEMs) for passenger vehicle components require complete replacement of the damaged component rather than attempting repair. Therefore, there still exists a need for a repair system and method that can repair damaged plastic components such that they can return to use rather than being discarded.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a heated gaseous welder system includes a welding tool and a welder control unit. The welder control unit includes a gaseous control system configured to selectively supply a gas to the welding tool and control at least one characteristic of the gas supplied to the welding tool. The welder control unit also includes a heater control system configured to selectively control power supplied to the welding tool.

In some embodiments, the at least one characteristic of the gas includes either or both of a type of gas and a flow rate of the gas from the welder control unit to the welding tool. In various embodiments, the welder control unit includes a housing, and the gaseous control system and the heater control system are provided within the housing. In various cases, the heated gaseous welder system includes a cooling system within the housing, and the cooling system includes at least one air blower or other suitable device to circulate air.

In certain embodiments, the gaseous control system includes a first inlet, a second inlet, an outlet, a first valve, a second valve, a source controller, and a flow controller. In certain cases, the source controller is configured to selectively position the first valve between a closed position and an open position, where the open position opens a gaseous pathway between the first inlet and the outlet for a first gas. In some examples, the source controller is configured to selectively position the second valve between a closed position and an open position, where the open position opens a gaseous pathway between the second inlet and the outlet for a second gas. In various aspects, the flow controller is downstream from the first valve and the second valve and is configured to detect an actual flow rate of the gas from the outlet to the welding tool and control the actual flow rate based on a difference between the actual flow rate and a desired flow rate.

In various embodiments, the heater control system includes a heater controller and an output measuring device communicatively coupled to the heater controller. In some aspects, the heater controller is adjustable such that the power applied to the welding tool is controllable. In some examples, the output measuring device is configured to provide a visual output of the power applied to the welding tool. In various examples, the heater controller is a variable speed fan controller which is a type of rheostat. In various examples, the heater control system includes a heater controller (including but not limited to a rheostat, a heating element, and an output measuring device. In certain cases, the measuring device may be a digital multimeter capable of reading voltage, amperage, power, and/or energy metering. In various cases, the measuring device has a screen (including, but not limited to an LCD screen or other suitable type of screen) and is wired to a current transformer that reads between the heating control and element.

According to certain embodiments of the present invention, a heated gaseous welder system includes a welding tool and a welder control unit. The welder control unit includes a gaseous control system. In various aspects, the gaseous control system includes a first inlet, a second inlet, an outlet, a first valve, a second valve, and a controller communicatively coupled to the first valve and the second valve. In certain cases, the outlet is a first outlet, and the gaseous control system includes a second outlet. The first outlet and/or the second outlet may be downstream from the valves. In various aspects, the first valve and/or the second valve are solenoid controlled valves. The controller is configured to selectively position the first valve between a closed position and an open position, and the open position opens a first gaseous pathway between the first inlet and the outlet. The controller is also configured to selectively position the second valve between a closed position and an open position, and the open position opens a second gaseous pathway between the second inlet and the outlet. In various aspects, the first valve is biased towards the open position and the second valve is biased towards the closed position. In some cases, the controller biases the first valve and the second valve. In various aspects, the controller is a footpedal activated single pole, double throw switch.

In certain embodiments, the welder control unit includes a housing. In some examples, the first inlet, the second inlet, and the outlet are provided on the housing; the first valve and the second valve are provided within the housing; the controller is external to the housing. In some embodiments, the controller includes a pedal.

In various embodiments, the controller is a source controller, and the gaseous control system includes a flow controller downstream from the first valve and the second valve. The flow controller may be configured to detect an actual flow rate of the gas from the outlet to the welding tool and control the actual flow rate based on a difference between the actual flow rate and a desired flow rate. In some aspects, the welder control unit includes a heater control system with a heater controller and an output measuring device communicatively coupled to the heater controller. The heater controller may be adjustable such that a power applied to the welding tool is controllable, and the output measuring device may be configured to provide a visual output of the power applied to the welding tool.

In some examples, the heated gaseous welder system includes a first gaseous source removably connected to the first inlet and a second gaseous source removably connected to the second inlet. In certain aspects, the first gaseous source includes air, such as pressurized air, and the second gaseous source includes an inert gas. In various examples, the inert gas includes nitrogen. In certain examples, the controller controls the first valve and the second valve such that a state of the first valve is opposite from a state of the second valve. According to certain embodiments, the controller is configured to selectively position the first valve at an intermediate position between the closed position and the open position and to selectively position the second valve at an intermediate position between the closed position and the open position such that the first gaseous pathway and the second gaseous pathway are both partially opened.

According to certain embodiments of the present invention, a method of welding a plastic material with a heated gaseous welder system includes activating a gaseous control system of the heated gaseous welder system such that a first gas is supplied to a welding tool. The method includes activating a heater control system of the heated gaseous welder system such that power is supplied to the welding tool, where supplying power to the welding tool comprises heating the welding tool. The method also includes controlling the gaseous control system such that a second gas is supplied to the welding tool.

In various examples, the method includes providing a first gas, providing power to the hot gaseous welder system, and welding with the first gas. The method may include providing a second gas and welding with the second gas. In some examples, activating the gaseous control system includes controlling a flow controller of the gaseous control system such that a flow rate of the first gas to the welding tool is from about 8 L/min. to about 20 L/min. In various examples, controlling the gaseous control system includes restricting a flow of the first gas to the welding tool while the second gas is supplied to the welding tool and controlling the flow controller such that a flow rate of the second gas to the welding tool is from about 8 L/min. to about 20 L/min. In some cases, restricting the flow of the first gas includes controlling the flow of the first gas to about 0 L/min.

In some embodiments, activating the heater control system includes activating a master switch such that power is supplied from a power source to a heater controller of the heater control system and controlling the heater controller such that the power applied to the welding tool is from about 0 W to about 500 W. In various cases, the power applied to the welding tool is from about 100 W to about 500 W, such as from about 200 W to about 500 W. In various embodiments, controlling the gaseous control system includes controlling the flow controller such that a flow rate of the second gas to the welding tool is from about 8 L/min. to about 20 L/min. The method may include controlling a heater controller of the heater control system such that the power applied to the welding tool is from about 0W to about 500 W and forming a weld having a thickness less than about 0.13 in. in a plastic material with the welding tool. In some examples, the thickness of the weld is from about 0.03 in. to about 0.13 in.

In various embodiments, activating the gaseous control system such that the first gas is supplied to a welding tool includes restricting a flow of the second gas to the welding tool while the first gas is supplied to the welding tool. In certain cases, the first gas includes air and the second gas includes an inert gas.

DETAILED DESCRIPTION

Figure 1:
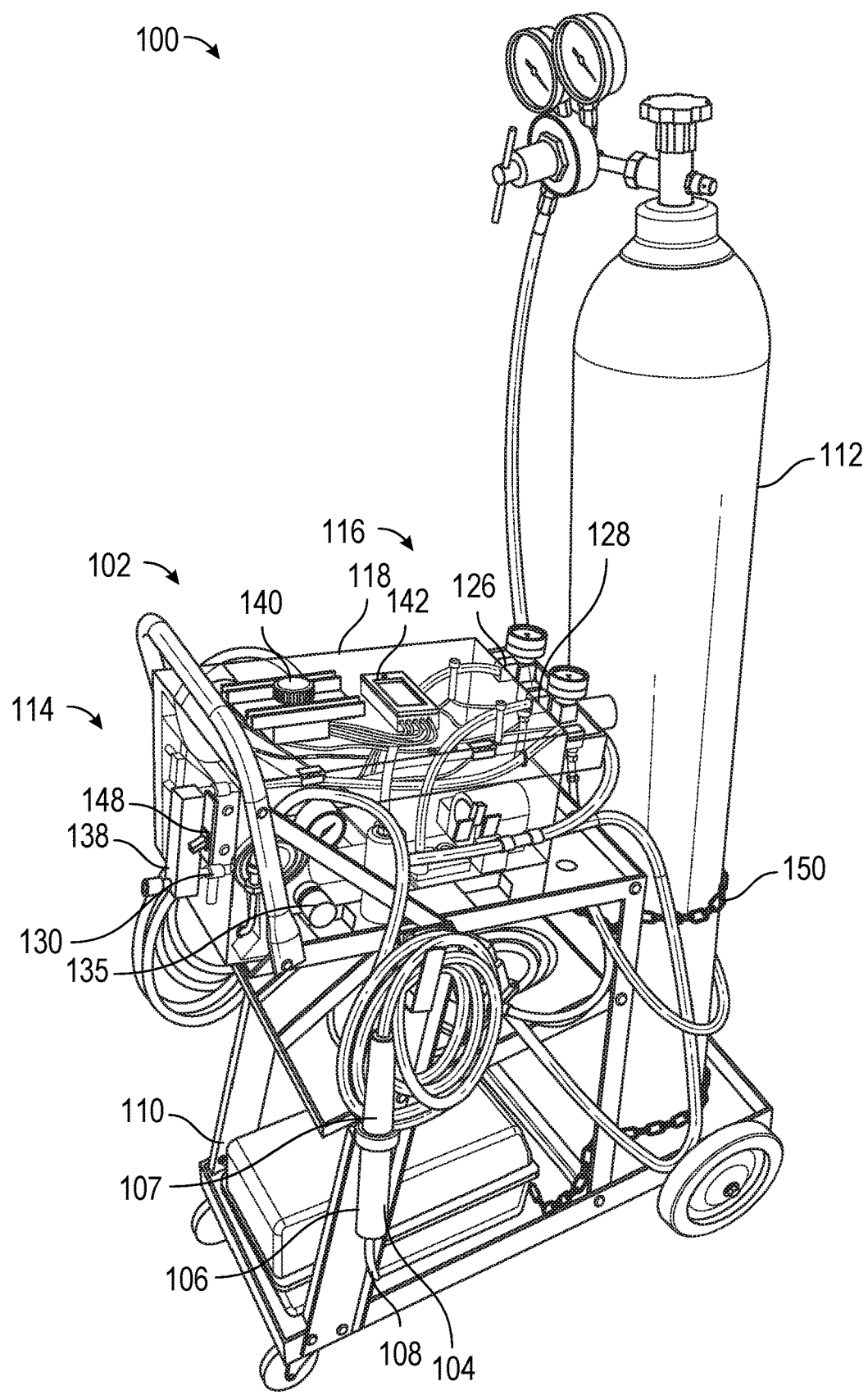
FIG. 1 is a perspective view of a hot gaseous welder system according to certain embodiments of the present invention.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide a hot gaseous welder system for welding plastic material. While the hot gaseous welder system is discussed for use with aircraft and aviation components, it is by no means so limited. Rather, embodiments of the hot gaseous welder system may be used to weld plastic components in other environments or otherwise as desired. One or more gases advantageously may be used as fluids with the hot gaseous welder system, although in certain cases one or more liquids conceivably could be used instead.

FIGS. 1-6 illustrate a hot gaseous welder system 100 (hereinafter "welder system 100") according to certain embodiments of the present invention. In various examples, the welder system 100 includes a welder control unit 102 and a welding tool 104. The welder system 100 may also optionally include various other components such as a movable support 110, a gaseous supply 112, a power source, etc.

Figure 6:
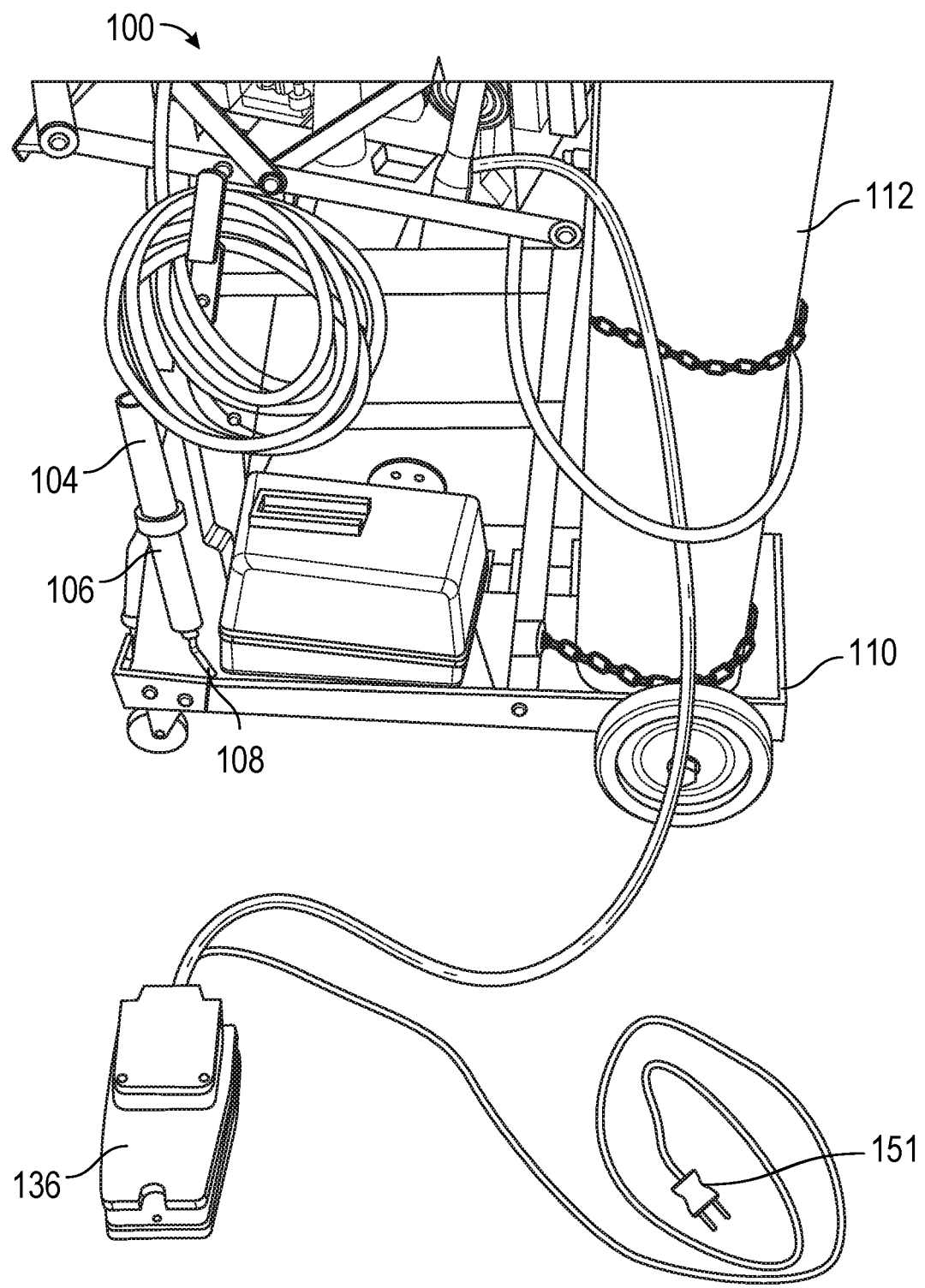
FIG. 6 is a perspective view of another portion of the hot gaseous welder system of FIG. 1.

As best illustrated in FIGS. 1 and 6, the welding tool 104 includes a barrel 106 and a tip 108. In various examples, the barrel 106 houses a heating element that heats a gas that is supplied by the welder control unit 102 to the welding tool 104. During a welding process, a user may grip a handle 107 of the welding tool 104, and the heated gas may be dispensed through the tip 108. The tip 108 may be any of various types of welding tips, and the particular type of tip 108 included with the welder system 100 may be selected based on desired flow characteristics, an area to be welded, and/or a desired welding technique. For example, in some cases, the tip 108 may be a barrel tip, a tacking tip, a flat nozzle tip, or a speed welding tip, although various other types of tips may be utilized.

The welder control unit 102 includes a gaseous control system 116 and a heater control system 114. As discussed in detail below, the gaseous control system 116 may control a supply of a gas to the welding tool 104 and may also control at least one characteristic of the gas supplied to the welding tool 104, and the heater control system 114 may control the power supplied to the welding tool 104.

Figure 7:
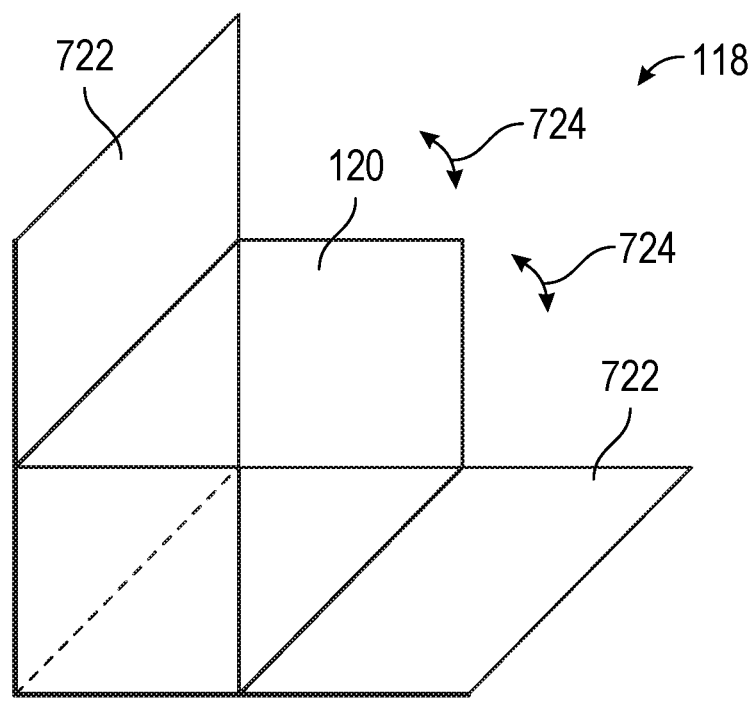
FIG. 7 is a perspective view of a housing of a welder control unit for a hot gaseous welder system according to certain embodiments of the present invention.

In some examples, the welder control unit 102 includes a housing 118 having a housing chamber 120 (see, e.g., housing chamber 120 in FIG. 7). Various components of the gaseous control system 116 and the heater control system 114 may be provided on the housing 118, within the housing chamber 120, or external to the housing 118 as discussed below. In certain examples, the housing 118 is constructed from a rigid or semi-rigid material. In some cases, the housing 118 may be formed of materials including but not limited to aluminum, stainless steel, aramid fibers, polycarbonate, polypropylene, other metallic materials, composite materials, combinations thereof, or other similar materials. In some examples, the housing 118 is transparent such that the user can inspect the components within the housing chamber 120 without opening up the housing 118. In other examples, the housing 118 need not be transparent. Referring to FIG. 7, in various examples, the housing 118 may include one or more panels 722 that are pivotable between an open position and a closed position (see arrows 724) such that the user can selectively access the housing chamber 120. In the example of FIG. 7, two adjacent panels 722 are pivotably attached to the housing 118; however, the number and location of the panels 722 should not be considered limiting on the current disclosure. Various suitable connectors may be utilized to pivotably connect the panels 722 including, but not limited to, pins, bolts, hinges, clips, clasps, straps, etc.

In certain examples, a cooling system 144 is provided with the housing 118 to control the atmosphere and/or temperature within the housing chamber 120. In the present example, the cooling system 144 includes air movers 146, although various other suitable cooling devices may be utilized to control the atmosphere and/or temperature within the housing chamber 120. The number of air movers 146 should not be considered limiting on the current disclosure.

The gaseous control system 116 includes a first inlet 126, a second inlet 128, an outlet 130, a first valve 132 provided between the first inlet 126 and the outlet 130, and a second valve 134 provided between the second inlet 128 and the outlet 130. Optionally, a first pressure regulator is provided between the first inlet 126 and the outlet 130 and a second pressure regulator is provided between the second inlet 128 and the outlet. In some cases, the first inlet 126, the second inlet 128, and the outlet 130 are provided on the housing 118 and the first valve 132 and second valve 134 are provided within the housing chamber 120, although they need not be in other examples.

The outlet 130 is in fluid communication with the welding tool 104 such that a gas can be supplied by the welder control unit 102 to the welding tool 104. In various examples, the first inlet 126 is removably connected to a supply of a first gas and the second inlet 128 is removably connected to a supply of a second gas. In some cases, the first gas includes a cooling gas that can provide cooling to the welding tool (particularly when the welding tool is not being used) and the second gas includes a welding gas that can be heated by the welding tool during welding to form a weld. In certain cases, the second gas is supplied from the gaseous supply 112, although it need not in other examples. In some examples, the first gas includes shop air and the second gas includes an inert gas such as nitrogen or other suitable fluids and/or gaseous substance; however, various other suitable fluids or gaseous substances may be used as the first gas or the second gas. Moreover, while two inlets and two fluids are described, it will be appreciated that the number of inlets or type of fluid or gaseous substance should not be considered limiting on the current disclosure.

The first valve 132 is movable between a closed position and an open position. In the open position, the first valve 132 opens a gaseous pathway between the first inlet 126 and the outlet 130 such that the first gas can be supplied to the welding tool 104. Similarly, the second valve 134 is movable between a closed position and an open position, and, in the open position, the second valve 134 opens a gaseous pathway between the second inlet 128 and the outlet 130 such that the second gas can be supplied to the welding tool 104. In various examples, the first valve 132 is biased towards the open position and the second valve 134 is biased towards the closed position. In certain examples, a default position of the first valve 132 is the open position (i.e., it is "normally open") and a default position of the second valve 134 is the closed position (i.e., it is "normally closed"). Optionally, a visual indicator 129 is communicatively coupled to the first valve 132 and a visual indicator 131 is communicatively coupled to the second valve 134. The visual indicators 129, 131 may provide visual indications such as lights, colors, etc. when the valves 132, 134 are in the open or closed positions, respectively. While visual indicators are provided in the current example, in other example, various other suitable types of indicators may be utilized to indicate the position of the first valve 132 and/or the second valve 134. Optionally, one or more filters 135 may be provided with the gaseous control system 116 that filter the first gaseous supply or the second gaseous supply before they are supplied to the welding tool 104.

In certain embodiments, the gaseous control system 116 includes a source controller 136 that is communicatively coupled to the first valve 132 and the second valve 134 to control the positioning of the first valve 132 and the second valve 134. In some examples, the source controller 136 controls the first valve 132 and the second valve 134 such that the first valve 132 is in the open position when the second valve 134 is in the closed position and vice versa. In certain examples, the source controller 136 may selectively position the first valve 132 at an intermediate position between the closed position and the open position and the second valve 134 at an intermediate position between the closed position and the open position such that the first gas pathway and the second pathway are both partially opened. In various cases, the source controller 136 is a pedal; however, in other examples, various other suitable controllers for controlling the positioning of the first valve 132 and the second valve 134 may be utilized.

In various embodiments, the gaseous control system 116 includes a flow controller 138. In certain cases, the flow controller 138 is downstream from the first valve 132, the second valve 134, and the outlet 130, although it need not be in other examples. For example in other cases, the flow controller 138 is upstream from the outlet 130. The flow controller 138 controls at least one flow characteristic of the gas supplied by the welder control unit 102 to the welding tool 104. In the present example, the at least one flow characteristic is a flow rate; however, in other examples, various other flow characteristics may be controlled by the flow controller 138. In various aspects, the flow controller 138 may detect an actual flow rate of the gaseous substance flowing from the welder control unit 102 to the welding tool 104. Based on the actual flow rate, the flow controller 138 may control the gas flow by increasing the flow rate, decreasing the flow rate, or maintaining the flow rate. In some aspects, the flow controller 138 controls the gaseous flow such that the flow rate of the gas from the welder control unit 102 to the welding tool 104 is from greater than 0 L/min. to about 20 L/min. For example, in some cases, the flow controller 138 controls the gaseous flow such that the flow rate of the gas is from about 8 L/min. to about 20 L/min. In other examples, the flow rate may be greater than 20 L/min. In certain cases, the flow controller 138 controls the flow rate based on a difference between the actual flow rate and a desired flow rate. The flow controller 138 may be various suitable devices for controlling the gaseous flow from the welder control unit 102 to the welding tool 104. In current embodiment, the flow controller 138 is a flow meter.

The heater control system 114 includes a heater controller 140 and an output measuring device 142 communicatively coupled with the heater controller 140. Optionally, the heater control system 114 includes a master switch 148 connected to the heater controller 140, output measuring device 142, and/or welding tool 104. In various examples, the heater control system 114 also includes a temperature sensor 143 (see FIG. 9) that detects a temperature of the gas exiting the welding tool 104. The temperature sensor 143 may be communicatively coupled to the output measuring device 142 and/or other dedicated device as desired. In some cases, the heater controller 140, master switch 148, and output measuring device 142 are provided on the housing 118; however, in other examples, the heater controller 140 and output measuring device 142 may be provided at various other suitable locations.

The heater controller 140 is connectable to a power source 152 (see FIG. 9) and controls the power applied to the heating element of the welding tool 104. In some cases, the power source 152 is a component of the welder control unit 102 such as a battery or other suitable power source; however, in other examples, the power source 152 may be external to the welder control unit 102, and the heater controller 140 is connected to the power source 152 through a suitable connector such as a plug 151. The heater controller 140 may be various suitable devices for controlling the power applied to the welding tool 104. In the present example, the heater controller 140 is a variable fan speed controller (or rheostat), although various other suitable devices may be utilized. In certain aspects, the heater controller 140 controls the power applied to the welding tool 104 such that during welding, the power is from about 0 W to about 500 W, such as from about 100 W to about 500 W, such as from about 200 W to about 500 W.

The output measuring device 142 may detect various characteristics of the electricity provided to the welding tool 104 and provide the detected characteristic information to the user. For example, in various cases, the output measuring device 142 may detect and provide the voltage, current, power, etc. of the electricity provided to the welding tool 104.

Figure 2:
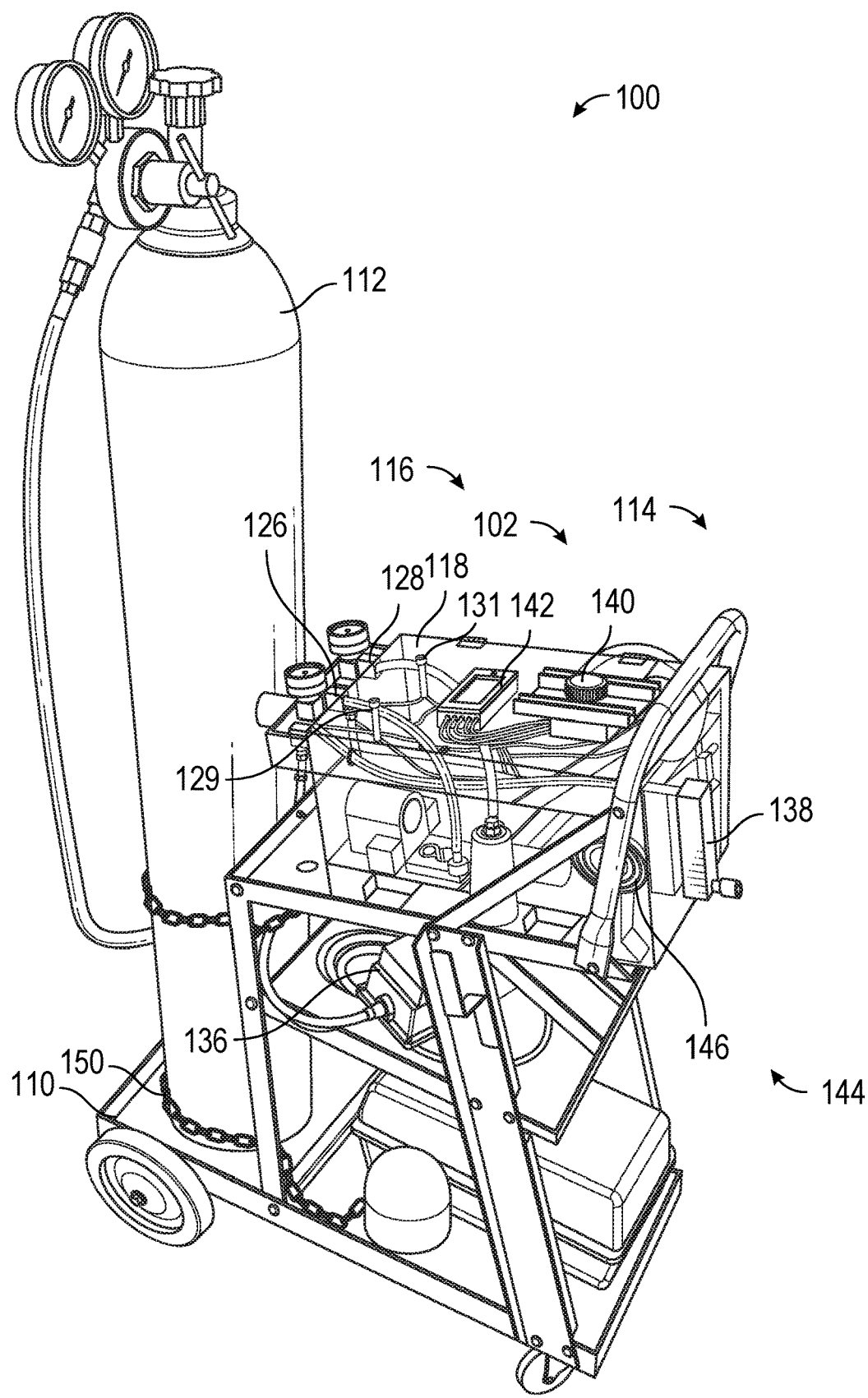
FIG. 2 is another perspective view of the hot gaseous welder system of FIG. 1.
Figure 3:
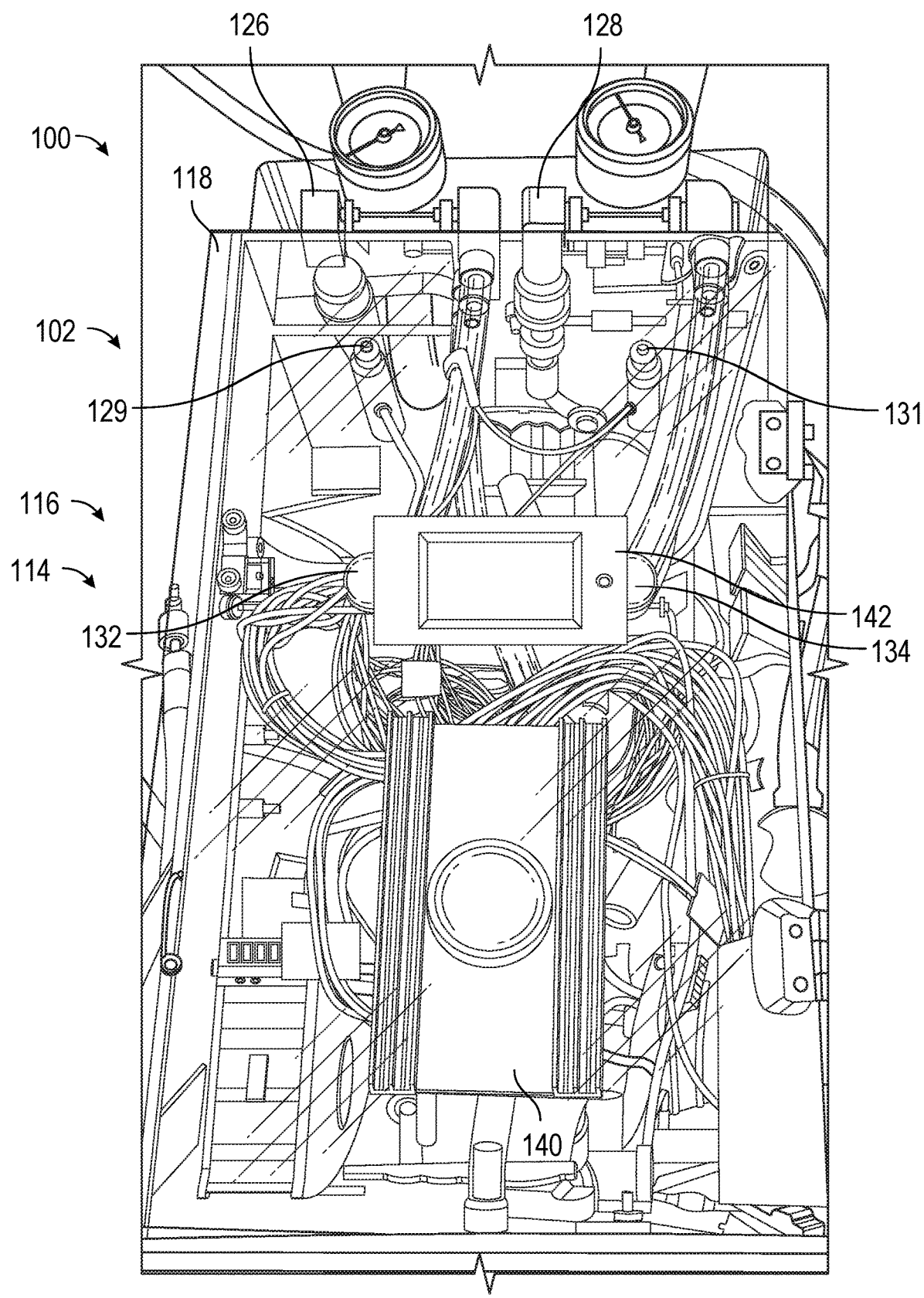
FIG. 3 is a perspective view of a portion of the hot gaseous welder system of FIG. 1.
Figure 4:
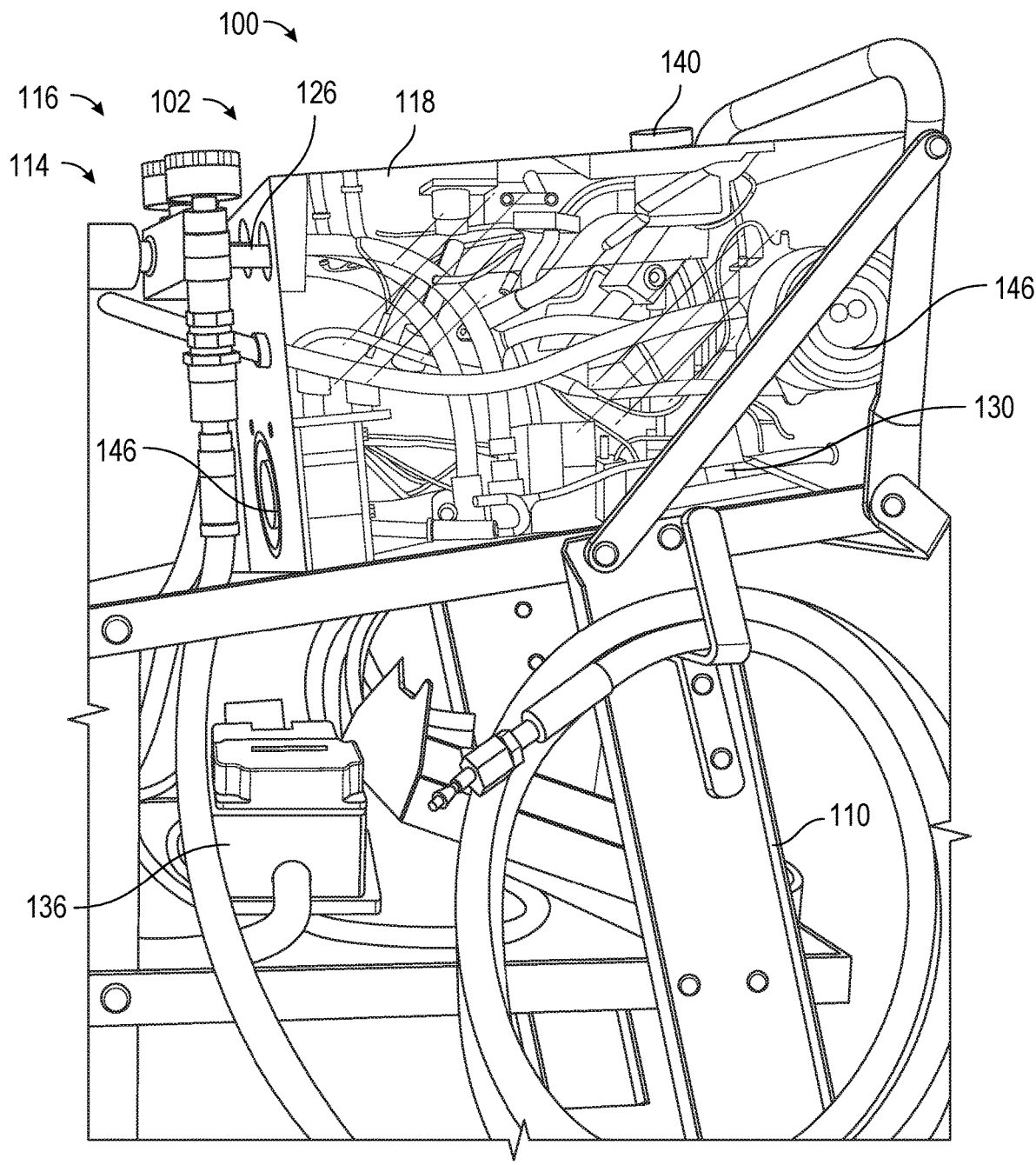
FIG. 4 is a perspective view of another portion of the hot gaseous welder system of FIG. 1.
Figure 5:
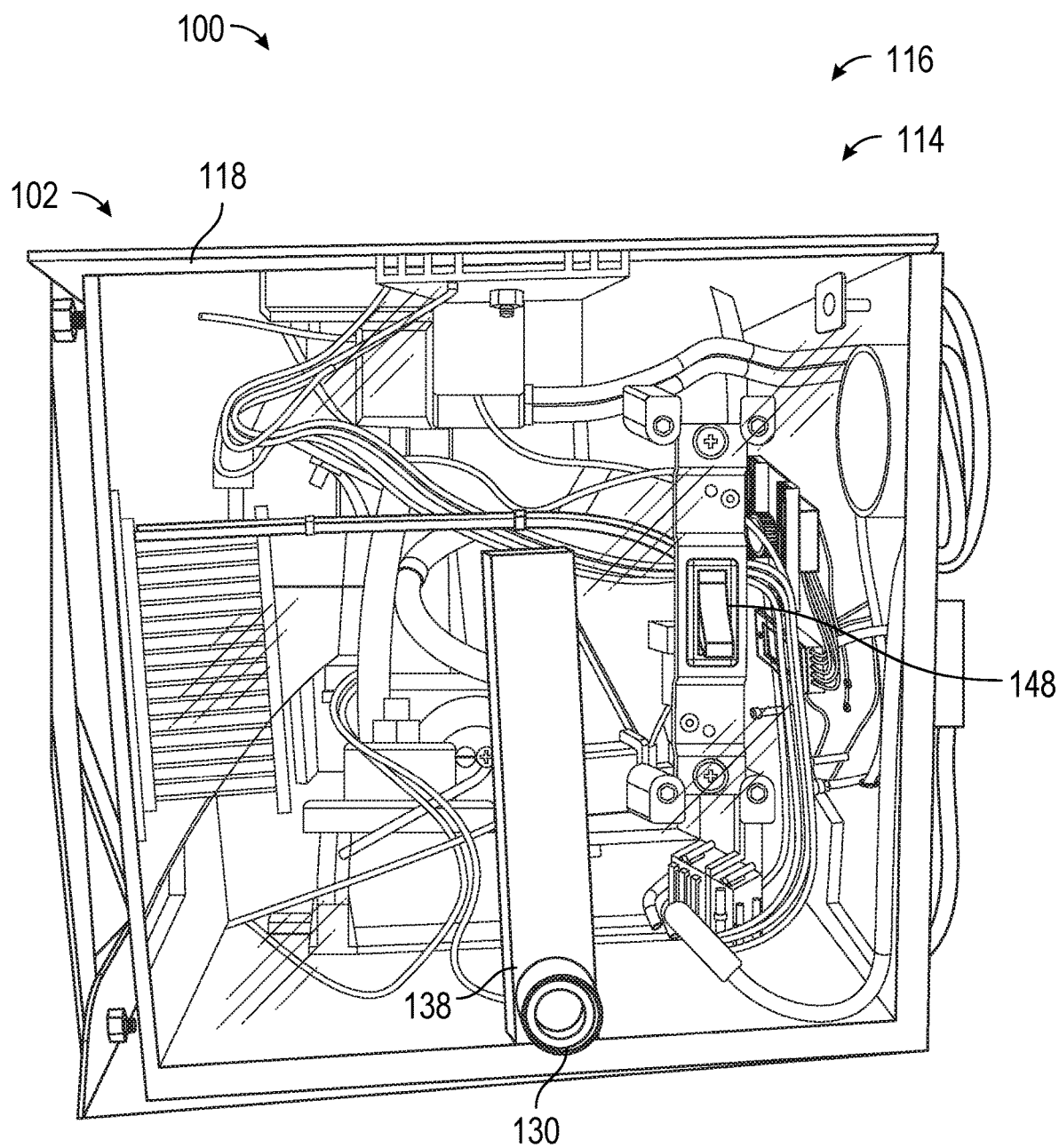
FIG. 5 is a perspective view of another portion of the hot gaseous welder system of FIG. 1.

As mentioned, in addition to the welder control unit 102, the welder system 100 may include a movable support 110. As best illustrated in FIGS. 1 and 2, the welder control unit 102 may be supported on the movable support 110, and the movable support 110 facilitates movement of the welder control unit 102 to various welding locations. In some cases, the gaseous supply 112 is supported on the movable support 110, although it need not be. Optionally, the movable support 110 includes a securing mechanism 150 that removably secures or fixedly secures the gaseous supply 112 on the movable support 110. The securing mechanism 150 may be various suitable devices including, but not limited to, chains, straps, clips, clasps, hooks, rope, brackets, or various other suitable devices.

Figure 8:
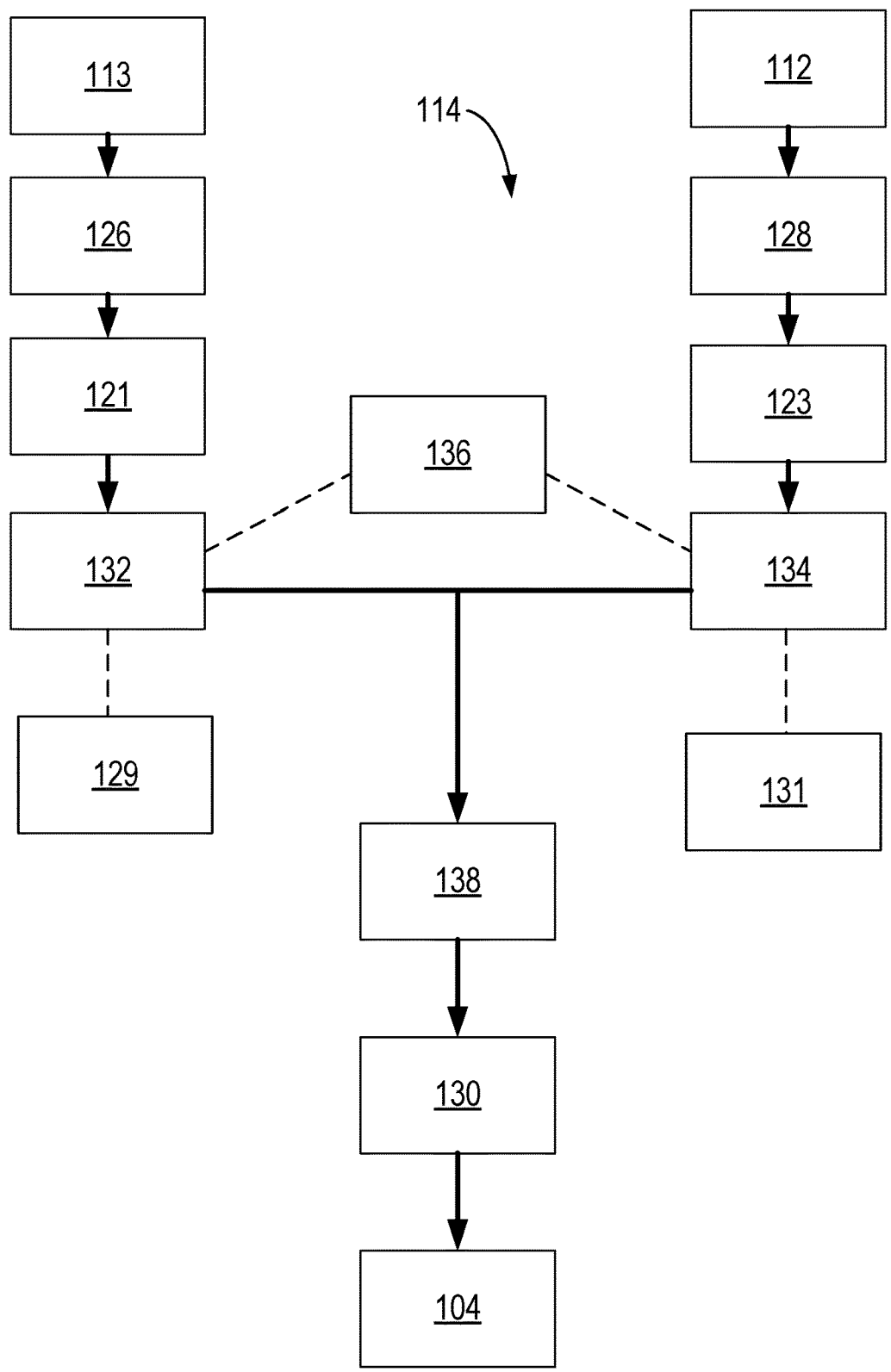
FIG. 8 is a schematic of a gaseous flow path controlled by a flow control system of a welder control unit for a hot gaseous welder system according to certain embodiments of the present invention.

FIG. 8 is a schematic of the gaseous control system 116 and illustrates a flow path of gases within the hot gaseous welder system 100. As illustrated in FIG. 8, a cooling gaseous supply 113 is in fluid communication with the first inlet 126 and the gaseous supply 112 is in fluid communication with the second inlet 128. Based on the positioning of the first valve 132 and the second valve 134 as controlled by the source controller 136, the gas from the first inlet 126 and/or the second inlet 128 may be provided to the welding tool 104. As illustrated in FIG. 8, optionally a pressure regulator 121 is provided between the first inlet 126 and the first valve 132 and a pressure regulator 123 is provided between the second inlet 128 and the second valve 134.

Figure 9:
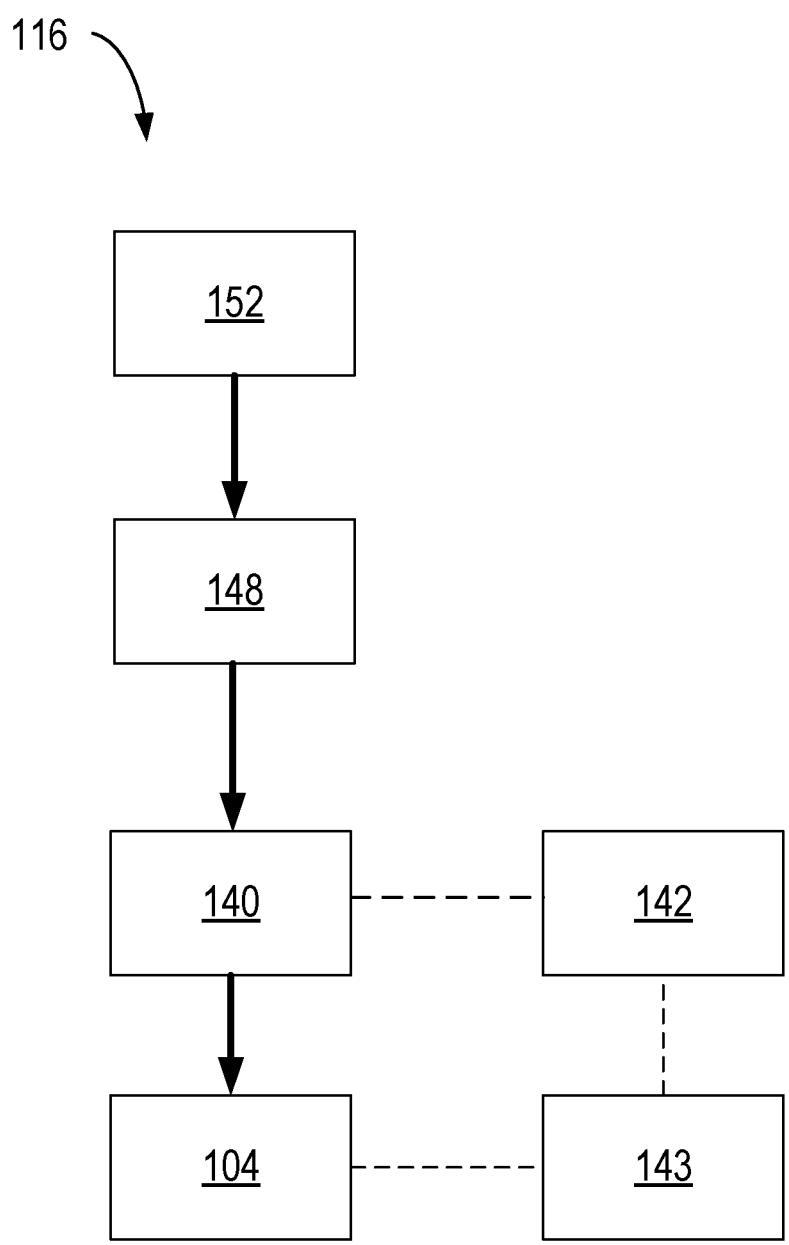
FIG. 9 is a schematic of a power flow path controlled by a heater control system of a welder control unit for a hot gaseous welder system according to certain embodiments of the present invention.

FIG. 9 is a schematic of the heater control system 114 and illustrates a flow path of power within the hot gaseous welder system 100. As illustrated in FIG. 9, the master switch 148 controls whether power is provided from the power source 152, and the heater controller 140 controls the power applied to the welding tool 104.

Figure 10:
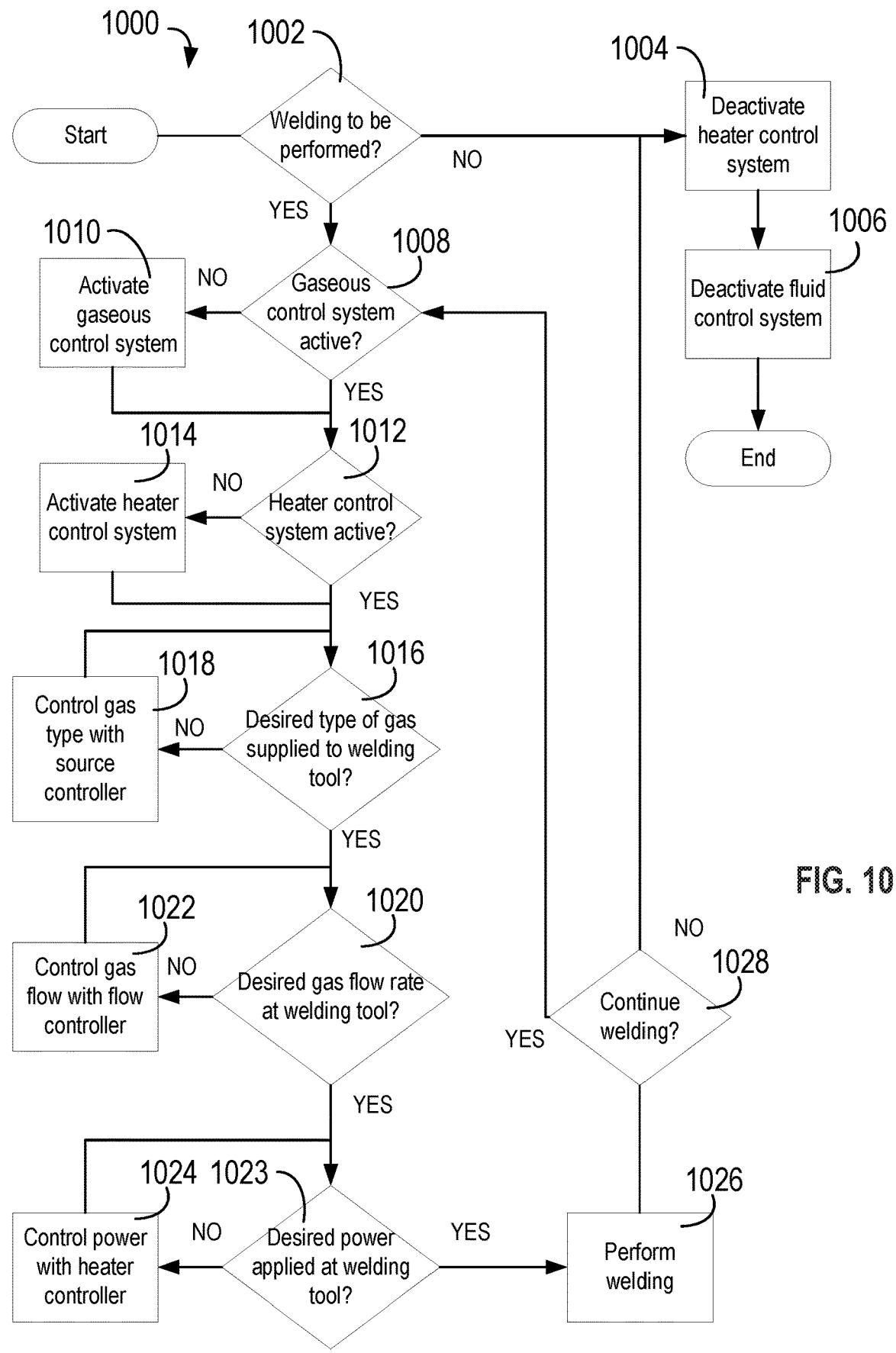
FIG. 10 is a flow chart of a welding process with a hot gaseous welder system according to certain embodiments of the present invention.

FIG. 10 illustrate various steps during a welding process 1000 and are described in detail below with reference to the hot gaseous welder system 100.

In some optional examples, the method includes setting up the welder system 100. In various examples, setting up the welder system 100 includes selecting the type of tip 108 for the welding tool 104 and installing the selected tip 108 on the welding tool 104. In some cases, setting up the welder system 100 includes moving the welder system 100 to a welding location such as a welding station or other suitable location. In certain examples, setting up the welder system 100 includes connecting the first inlet 126 to the gaseous supply 113 and connecting the second inlet 128 to the gaseous supply 112. In some examples, setting up the welder system 100 includes ensuring that the master switch 148 and heater controller 140 of the heater control system 114 are in an "off" or deactivated configuration.

In a block 1002, the process determines whether welding is to be performed. It will be appreciated that block 1002 (and any of the following process blocks) may be performed by a controller such as various computing devices with a processor and memory, various other suitable devices, or a user of the welder system 100.

In a block 1004, if welding is not to be performed based on block 1002, the heater control system 114 is deactivated if it is not already deactivated. Deactivating the heater control system 114 may also include moving the second valve 134 to the closed position (if it is not already in the closed position), and moving the first valve 132 to the open position (if it is not already in the open position). In various aspects, deactivating the heater control system 114 includes controlling the heater control system 114 such that the power applied to the welding tool is 0 W. In some cases, deactivating the heater control system 114 includes allowing the welding tool 104 to cool for a cooling period. In some cases, the cooling period is about 10 minutes, although in other examples, the cooling period is less than 10 minutes or more than 10 minutes. In various aspects, deactivating the heater control system 114 includes deactivating the master switch 148.

In a block 1006, the gaseous control system 116 is deactivated. In various aspects, deactivating the gaseous control system 116 includes restricting the flow of gas from the gaseous supply 112 and from the gaseous supply 113.

In a block 1008, if welding is to be performed based on block 1002, the process determines whether the gaseous control system 116 is active.

In a block 1010, if the gaseous control system is not active based on block 1008, the gaseous control system 116 is activated. In some cases, activating the gaseous control system 116 includes providing power to the gaseous control system 116 from a power source such as the power source 152. In various aspects, activating the gaseous control system 116 activates flow from the gaseous supply 113, moves the second valve 134 to the closed position (if it is not already in the closed position), and moves the first valve 132 to the open position (if it is not already in the open position). In certain examples, moving the first valve 132 to the open position causes the visual indicator 129 to provide an indication, such as the activation of a light. Activating the gaseous control system 116 may further include controlling the flow controller 138 to control the flow rate of the first gaseous substance to the welding tool 104. In some cases, the flow controller 138 is controlled such that the flow rate is from about 0 L/min. to about 20 L/min., such as from about 8 L/min. to about 20 L/min. In other examples, the flow controller 138 is controlled such that the flow rate is less than 8 L/min. or greater than 20 L/min.

In a block 1012, the process determines whether the heater control system is activate.

In a block 1014, if the heater control system is not active based on block 1012, the heater control system 114 is activated. In certain cases, activating the heater control system 114 includes activating the master switch 148 such that power can flow from the power source 152 to the heater controller 140, output measuring device 142, and welding tool 104. In some cases, activating the heater control system 114 includes controlling the power applied to the welding tool 104 with the heater controller 140 such that the power applied to the welding tool is from about 100 W to about 500 W.

In a block 1016, the process determines whether a desired type of gaseous substance is currently supplied to the welding tool 104.

In a block 1018, if the desired type of gaseous substance is not currently supplied to the welding tool based on block 1016, the source controller 136 selectively positions the first valve 132 and the second valve 134 to control the gaseous pathways to the outlet 130. In some cases, the source controller 136 is controlled to move the second valve 134 to the open position (if it is not already in the closed position) and to move the first valve 132 to the closed position (if it is not already in the open position) such that the gaseous pathway from the gaseous supply 112 is opened and the gaseous pathway from the gaseous supply 113 is closed. In various cases, the source controller 136 is controlled to move the second valve 134 to an intermediate position and the first valve 132 to an intermediate position such that a mixture of gases from the gaseous supply 113 and the gaseous supply 112 is supplied to the outlet 130.

In a block 1020, the process determines whether the gaseous substance supplied to the welding tool 104 is at a desired flow rate.

In a block 1022, if the flow rate of the gaseous substance is not a desired flow rate based on block 1020, the flow controller 138 adjusts the flow rate. In some cases, the flow controller 138 controls the flow rate such that the flow rate is from about 0 L/min. to about 20 L/min., such as from about 8 L/min. to about 20 L/min.

In a block 1023, the process determines whether a desired power is applied to the welding tool 104.

In a block 1024, if the power applied to the welding tool 104 is not a desired power based on block 1023, the heater controller 140 adjusts the power applied to the welding tool 104. In some cases, the heater controller 140 controls the power such that the power applied to the welding tool 104 is from about 100 W to about 500 W.

Figure 13:
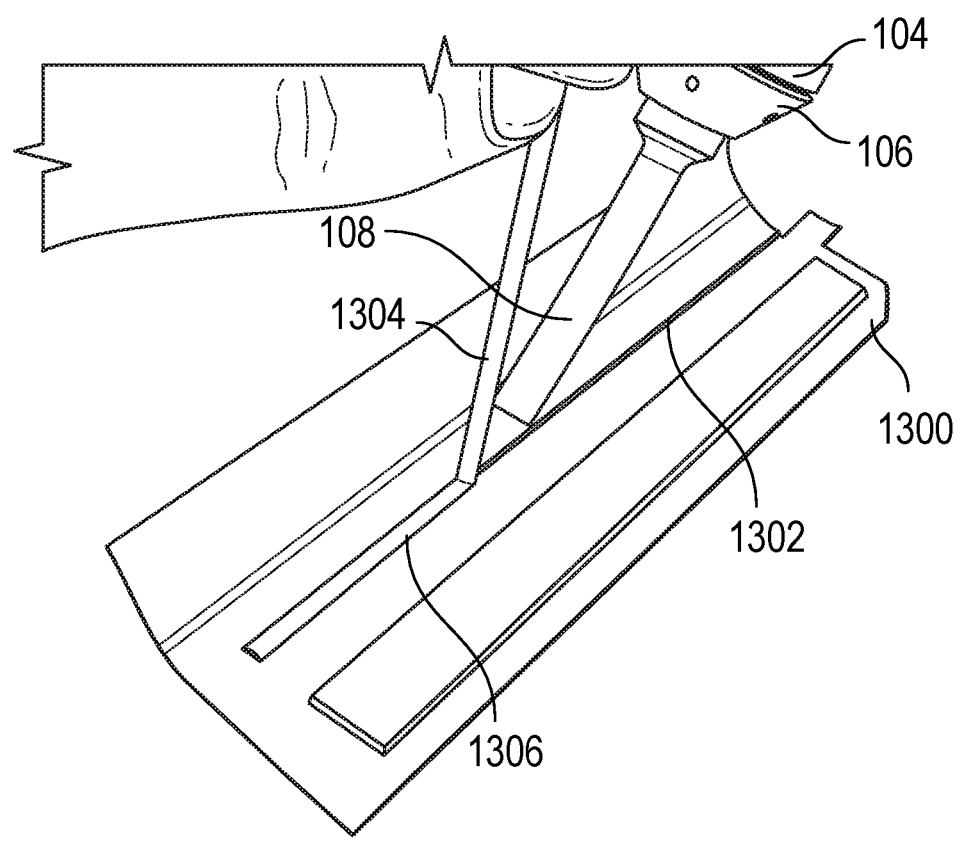
FIG. 13 is a perspective view of a plastic material being welded with a hot gaseous weld system according to certain embodiments of the present invention.

In a block 1026, welding is performed with the welder system 100. Referring to FIG. 13, in various examples, welding with the welder system 100 includes determining a size and shape of a crack 1302 in the plastic component 1300. Optionally, a backing layer such as aluminum tape, finned substrates, combinations thereof, or other suitable materials is provided over the crack 1302. In various cases, welding includes providing a source rod 1304 of exact or like material as the plastic component 1300, positioning the source rod 1304 adjacent to the crack 1302, and melting the rod 1304 with the welding tool 104 such that the material of the rod 1304 fills the crack 1302 and is blended with the plastic component 1300 as a weld 1306. In various aspects, the weld 1306 formed with the welder system 100 has a thickness of from about 0.03 in. to about 0.13 in. In other examples, the weld 1306 may have a thickness that is less than 0.03 in. or greater than 0.13 in. in various aspects, and the weld 1306 may be subsequently processed through sanding or other suitable processes such that the weld 1306 has a thickness that is the same as the plastic component 1300.

In a block 1028, the process determines whether additional welding is to be performed. If additional welding is to be performed, the process returns to block 1008. If no additional welding is to be performed, the process proceeds to block 1004.

Figure 11:
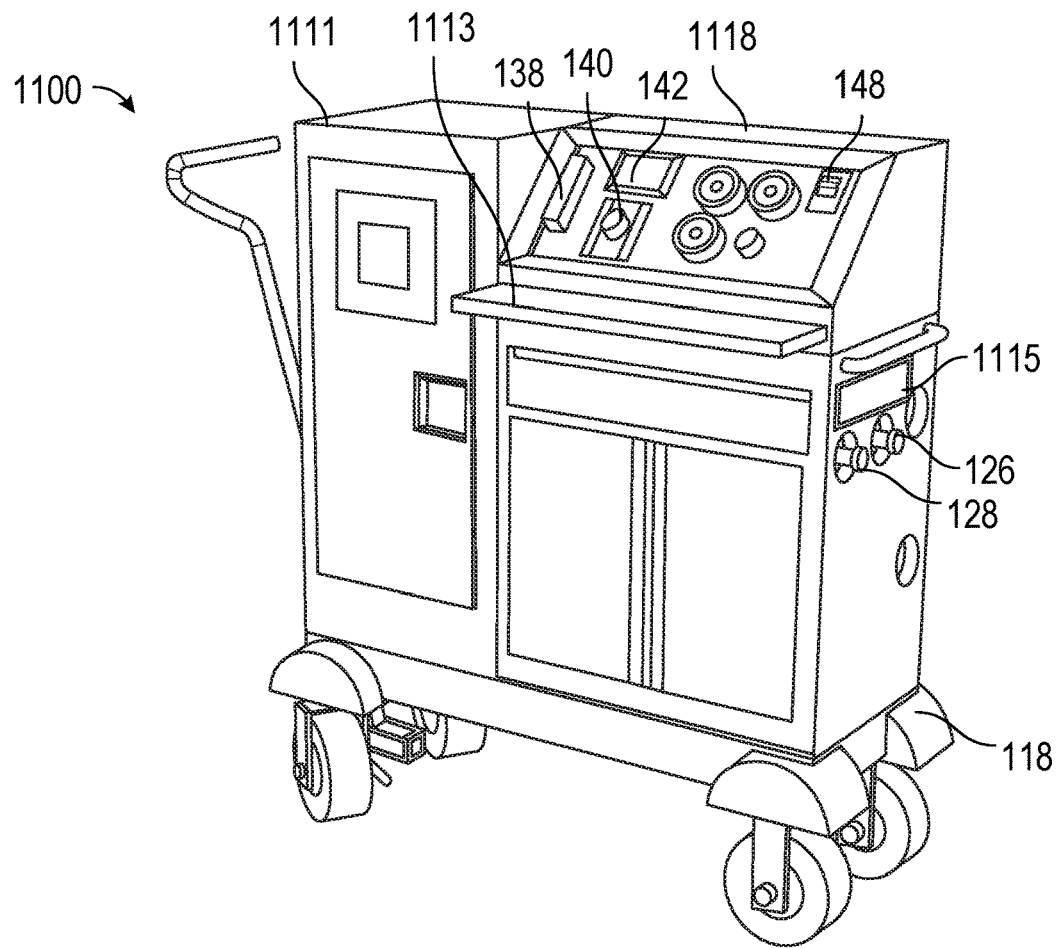
FIG. 11 is a perspective view of a hot gaseous welder system according to certain embodiments of the present invention.
Figure 12:
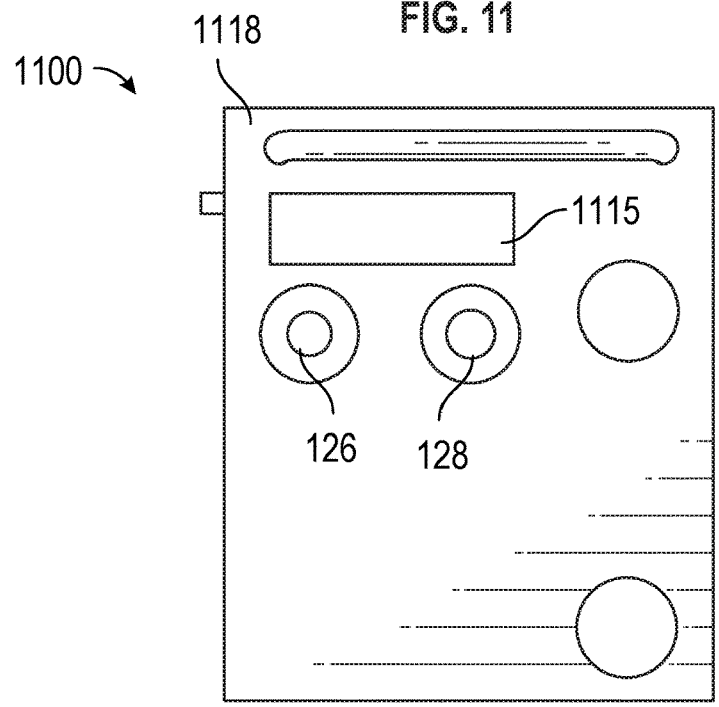
FIG. 12 is a side view of the hot gaseous welder system of FIG. 11.

FIG. 11 illustrates another example of a hot gaseous welding system 1100. The hot gaseous welding system 1100 is substantially similar to the hot gaseous welder system 100 except that the housing 1118 of the hot gaseous welding system 1100 is not transparent and the arrangement of various components of the welder control unit 102 has been modified compared to the housing 118. The housing 1118 includes various optional features compared to the housing 118 such as a movable tray 1113 and a power strip 1115. In addition, the movable support 1110 of the hot gaseous welding system 1100 includes a gaseous supply cabinet 1111 that may optionally house a gaseous supply.

The welder system 100 (and/or welder system 1100) may allow for the repair and return to service of various plastic components that would otherwise be discarded by the aviation industry. Moreover, the welder system 100 may allow for the repair of plastic components having various thicknesses and complex shapes that were previously unrepairable by controlling at least one of the gaseous source, flow rate, and power supplied to the welding tool. For example, depending on the material to be welded, the shape of the material to be welded, the thickness of the material to be welded, a desired rate of welding, etc., the welder system 100 controls the type of gaseous substance supplied during welding, the amount or rate of gas supplied during welding, and the temperature of the welding tool 104 to produce an optimal weld. The control provided by the welder system 100 may further allow for the formation of thin welds that were previously unobtainable. For example, with the welder system 100, welds having a thickness of from about 0.03 in. to about 0.13 in. can be produced.

A collection of examples providing additional description of a variety of example types in accordance with the concepts described herein are provided below. These examples are not meant to be mutually exclusive, exhaustive, or restrictive; and the invention is not limited to these example examples but rather encompasses all possible modifications and variations within the scope of the issued claims and their equivalents.

Example 1. A heated gaseous welder system comprising: a welding tool; and a welder control unit comprising: a gaseous control system configured to selectively supply a gas to the welding tool and control at least one characteristic of the gas supplied to the welding tool; and a heater control system configured to selectively control power supplied to the welding tool.

Example 2. The heated gaseous welder system of any of the preceding or subsequent examples, wherein the at least one characteristic of the gas comprises a type of gas and a flow rate of the gas from the welder control unit to the welding tool.

Example 3. The heated gaseous welder system of any of the preceding or subsequent examples, wherein the welder control unit comprises a housing, and wherein the gaseous control system and the heater control system are provided within the housing.

Example 4. The heated gaseous welder system of any of the preceding or subsequent examples, further comprising a cooling system within the housing, wherein the cooling system comprises at least one air blower.

Example 5. The heated gaseous welder system of any of the preceding or subsequent examples, wherein the gaseous control system comprises: a first inlet; a second inlet; an outlet; a first valve; a second valve; a source controller, wherein the source controller is configured to selectively position the first valve between a closed position and an open position, wherein the open position opens a gaseous pathway between the first inlet and the outlet for a first gas, wherein the source controller is configured to selectively position the second valve between a closed position and an open position, wherein the open position opens a gaseous pathway between the second inlet and the outlet for a second gas; and a flow controller downstream from the first valve and the second valve, wherein the flow controller is configured to detect an actual flow rate of the gas from the outlet to the welding tool and control the actual flow rate based on a difference between the actual flow rate and a desired flow rate.

Example 6. The heated gaseous welder system of any of the preceding or subsequent examples, wherein the heater control system comprises a heater controller and an output measuring device communicatively coupled to the heater controller, wherein the heater controller is adjustable such that the power applied to the welding tool is controllable, and wherein the output measuring device is configured to provide a visual output of the power applied to the welding tool.

Example 7. A heated gaseous welder system comprising: a welding tool; and a welder control unit comprising a gaseous control system, wherein the gaseous control system comprises a first inlet, a second inlet, an outlet, a first valve, a second valve, and a controller communicatively coupled to the first valve and the second valve, wherein the controller is configured to selectively position the first valve between a closed position and an open position, wherein the open position opens a first gas pathway between the first inlet and the outlet, wherein the controller is configured to selectively position the second valve between a closed position and an open position, wherein the open position opens a second gas pathway between the second inlet and the outlet, and wherein the first valve is biased towards the open position and the second valve is biased towards the closed position.

Example 8. The heated gaseous welder system of any of the preceding or subsequent examples, wherein the welder control unit further comprises a housing, wherein the first inlet, the second inlet, and the outlet are provided on the housing, wherein the first valve and the second valve are provided within the housing, and wherein the controller is external to the housing.

Example 9. The heated gaseous welder system of any of the preceding or subsequent examples, wherein the controller comprises a pedal.

Example 10. The heated gaseous welder system of any of the preceding or subsequent examples, wherein the controller is a source controller, and wherein the gaseous control system further comprises a flow controller downstream from the first valve and the second valve, and wherein the flow controller is configured to detect an actual flow rate of the gas from the outlet to the welding tool and control the actual flow rate based on a difference between the actual flow rate and a desired flow rate.

Example 11. The heated gaseous welder system of any of the preceding or subsequent examples, wherein the welder control unit further comprises a heater control system comprising a heater controller and an output measuring device communicatively coupled to the heater controller, wherein the heater controller is adjustable such that a power applied to the welding tool is controllable, and wherein the output measuring device is configured to provide a visual output of the power applied to the welding tool.

Example 12. The heated gaseous welder system of any of the preceding or subsequent examples, further comprising a first gas source removably connected to the first inlet and a second gas source removably connected to the second inlet, wherein the first gas source comprises air, and wherein the second gas source comprises an inert gas.

Example 13. The heated gaseous welder system of any of the preceding or subsequent examples, wherein the controller is configured to selectively position the first valve at an intermediate position between the closed position and the open position and to selectively position the second valve at an intermediate position between the closed position and the open position such that the first gas pathway and the second gas pathway are both partially opened.

Example 14. A method of welding a plastic material with a heated gaseous welder system, the method comprising: activating a gaseous control system of the heated gaseous welder system such that a first gas is supplied to a welding tool; activating a heater control system of the heated gaseous welder system such that power is supplied to the welding tool, wherein supplying power to the welding tool comprises heating the welding tool; and controlling the gaseous control system such that a second gas is supplied to the welding tool.

Example 15. The method of any of the preceding or subsequent examples, wherein activating the gaseous control system comprises controlling a flow controller of the gaseous control system such that a flow rate of the first gas to the welding tool is from about 8 L/min. to about 20 L/min., and wherein controlling the gaseous control system comprises: restricting a flow of the first gas to the welding tool while the second gas is supplied to the welding tool; and controlling the flow controller such that a flow rate of the second gas to the welding tool is from about 8 L/min. to about 20 L/min.

Example 16. The method of any of the preceding or subsequent examples, wherein activating the heater control system comprises: activating a master switch such that power is supplied from a power source to a heater controller of the heater control system; and controlling the heater controller such that the power applied to the welding tool is from about 100 W to about 500 W.

Example 17. The method of any of the preceding or subsequent examples, wherein controlling the gaseous control system comprises controlling the flow controller such that a flow rate of the second gas to the welding tool is from about 8 L/min. to about 20 L/min., and wherein the method further comprises: controlling a heater controller of the heater control system such that the power applied to the welding tool is from about 100 W to about 500 W; and forming a weld having a thickness less than about 0.13 in. in a plastic material with the welding tool. The method may include forming a weld having a thickness of greater than 0.03 in.

Example 18. The method of any of the preceding or subsequent examples, wherein the thickness of the weld is from about 0.03 in. to about 0.13 in.

Example 19. The method of any of the preceding or subsequent examples, wherein activating the gaseous control system such that the first gas is supplied to a welding tool comprises restricting a flow of the second gas to the welding tool while the first gas is supplied to the welding tool.

Example 20. The method of any of the preceding or subsequent examples, wherein the first gas comprises air and wherein the second gas comprises an inert gas.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A heated gaseous welder system comprising:
a welding tool; and
a welder control unit comprising a gaseous control system, wherein the gaseous control system comprises;
a first inlet and a first valve, wherein a first gas flow path for a first gas is defined between the first inlet and the first valve;
a second inlet and a second valve, wherein a second gas flow path for a second gas is defined between the second inlet and the second valve, and wherein, upstream from an outlet, the second gas flow path is disconnected from the first gas flow path;
the outlet, wherein a joint gas flow path is defined between the outlet and both of the first valve and the second valve, wherein the joint gas flow path is separate from the first gas flow path and the second gas flow path; and
a controller communicatively coupled to the first valve and the second valve,
wherein the controller is configured to selectively position the first valve between a closed position and an open position, wherein, in the open position, the first gas flow path is fluidly connected to the joint gas flow path such that the first gas is flowable along the first gas flow path and the joint gas flow path from the first inlet to the outlet,
wherein the controller is configured to selectively position the second valve between a closed position and an open position, wherein in the open position, the second gas flow path is fluidly connected to the joint gas flow path such that the second gas is flowable along the second gas flow path and the joint gas flow path from the second inlet to the outlet,
wherein the first valve is biased towards the open position and the second valve is biased towards the closed position, and
wherein the welding tool is fluidly connected to the outlet such that a tool gas pathway is defined between the outlet and the welding tool.

2. The heated gaseous welder system of claim 1, wherein the welder control unit further comprises a housing, wherein the first inlet, the second inlet, and the outlet are provided on the housing, wherein the first valve and the second valve are provided within the housing, and wherein the controller is external to the housing.

3. The heated gaseous welder system of claim 2, wherein the controller comprises a pedal.

4. The heated gaseous welder system of claim 1, wherein the controller is a source controller, and wherein the gaseous control system further comprises a flow controller downstream from the first valve and the second valve, and wherein the flow controller is configured to detect an actual gas flow rate of the gas from the outlet to the welding tool and control the actual flow rate based on a difference between the actual flow rate and a predetermined flow rate.

5. The heated gaseous welder system of claim 1, wherein the welder control unit further comprises a heater control system comprising a heater controller and an output measuring device communicatively coupled to the heater controller, wherein the heater controller is adjustable such that a power applied to the welding tool is controllable, and wherein the output measuring device is configured to provide a visual output of the power applied to the welding tool.

6. The heated gaseous welder system of claim 1, further comprising a first gas source removably connected to the first inlet and a second gas source removably connected to the second inlet, wherein the first gas source comprises air, and wherein the second gas source comprises an inert gas.

7. The heated gaseous welder system of claim 1, wherein the controller is configured to selectively position the first valve at an intermediate position between the closed position and the open position and to selectively position the second valve at an intermediate position between the closed position and the open position such that the first valve and the second valve are both partially opened.

8. The heated gaseous welder system of claim 1, further comprising:
   a first visual indicator communicatively coupled to the first valve, wherein the first visual indicator is configured to provide a visual indication responsive to the first valve being in the open position.

9. The heated gaseous welder system of claim 8, wherein the first visual indicator comprises a light source, and wherein the first visual indicator is configured to emit a light as the visual indication responsive to the first valve being in the open position.

10. The heated gaseous welder system of claim 8, further comprising:
    a second visual indicator communicatively coupled to the second valve, wherein the second visual indicator is configured to provide a visual indication responsive to the second valve being in the open position.

* * * * *